Oct. 13, 1970  J. A. CORNELL  3,534,010
QUICK METHOD OF MAKING PURE VINYL CHLORIDE POLYMERS
Filed Jan. 3, 1966  2 Sheets-Sheet 1

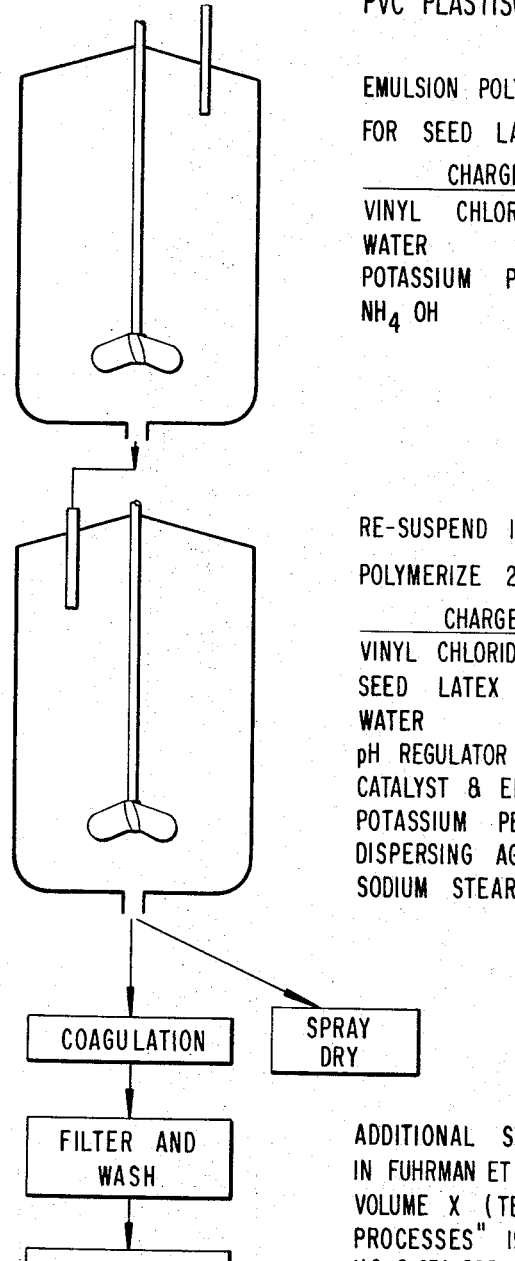

FIG.1  PRIOR ART PROCESS FOR MAKING PVC PLASTISOL GRADE RESIN

EMULSION POLYMERIZATION OF POWERS U.S. 2,520,959 FOR SEED LATEX

| CHARGE | PARTS |
|---|---|
| VINYL CHLORIDE | 60 |
| WATER | 48 |
| POTASSIUM PERSULFATE | 0.27 |
| $NH_4 OH$ | 0.27 |

RE-SUSPEND IN WATER, ADD CHARGE AND POLYMERIZE 24 HOURS AT 50°C

| CHARGE | PARTS |
|---|---|
| VINYL CHLORIDE | 45 |
| SEED LATEX | 0.8 |
| WATER | 36.7 |
| pH REGULATOR $NH_4 OH$ | 0.27 |
| CATALYST & EMULSIFIER, POTASSIUM PERSULFATE | 0.27 |
| DISPERSING AGENT, SODIUM STEARATE | 0.57 |

ADDITIONAL STABILIZING TREATMENT DISCLOSED IN FUHRMAN ET AL U.S. 2,674,593, IN HIGH POLYMERS VOLUME X (TEXT BOOK) SCHILDKNECHT "POLYMER PROCESSES" 1956 PAGE 558 AND IN CONDO ET AL U.S. 2,674,585 - U.S. 2,674,593

INVENTOR
JOHN A. CORNELL

BY *Abraham A. Saffitz*

ATTORNEY

Oct. 13, 1970      J. A. CORNELL      3,534,010

QUICK METHOD OF MAKING PURE VINYL CHLORIDE POLYMERS

Filed Jan. 3, 1966      2 Sheets-Sheet 2

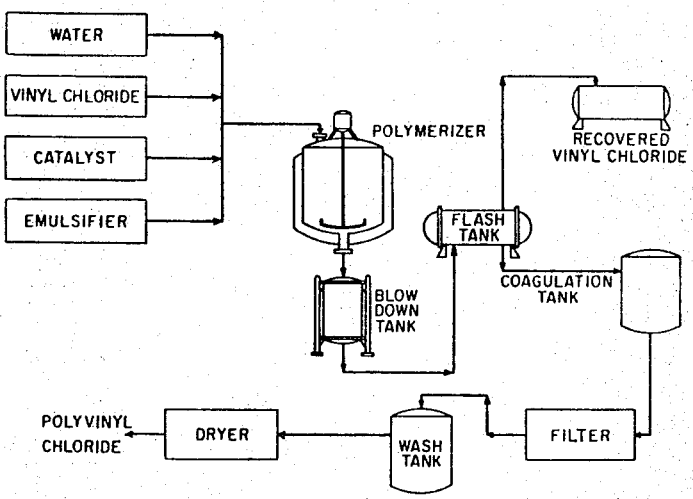

FIG. 3.    PRIOR ART METHOD FOR PVC RESIN IN TEXTBOOK

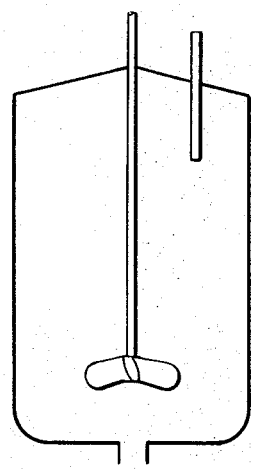

FIG. 2. PROCESS OF THE INVENTION FOR DISPERSION POLYMERIZATION OF VINYLCHLORIDE

| CHARGE | PARTS |
|---|---|
| VINYL CHLORIDE | 45 |
| WATER | 600 |
| pH REGULATOR, HYDROCHLORIC ACID (concentrated) | 0.3 |
| CATALYST, HYDROGEN PEROXIDE (30% SOL.) | 0.3 |
| DISPERSING AGENT, STARCH | 3.0 |
| PROMOTER, ASCORBIC ACID | 0.075 |

ADD CHARGE EXCEPT FOR CATALYST AT 50° -
ADD CATALYST -
POLYMERIZE FOR 15-70 MINUTES THEREAFTER.

INVENTOR
JOHN A. CORNELL

BY *Abraham A. Saffitz*

ATTORNEY

United States Patent Office 3,534,010
Patented Oct. 13, 1970

3,534,010
QUICK METHOD OF MAKING PURE VINYL
CHLORIDE POLYMERS
John A. Cornell, Philadelphia, Pa., assignor to Sartomer
Resins, Inc., Essington, Pa., a corporation of Delaware
Filed Jan. 3, 1966, Ser. No. 518,316
Int. Cl. C08f 3/30, 1/62, 1/11
U.S. Cl. 260—92.8                             1 Claim

ABSTRACT OF THE DISCLOSURE

A method of producing pure vinyl chloride polymer particles of diameter 0.1 to 0.8 microns, the particles being free from surface-coated impurities, the method comprising introducing vinyl chloride monomer into acidified water with 0.1 to 0.8% soluble starch dispersing agent and 0.01 to 0.05% ascorbic acid as promoter, adding hydrogen peroxide and stirring at 45–60° C. for at least one-half hour to form the polymer particles, neutralizing and digesting the starch with amylase to recover the polymer in pure form.

---

This invention relates to a new rapid method for the production of pure polymerized vinyl chloride and also relates to new polymerized solid vinyl chloride products in a form of homopolymer free from surface coated impurities which detract from the thermal stability, aging and electrical insulation properties.

In one preferred example of the process of the invention, 150 parts of vinyl chloride are introduced into 2,000 parts of acidified water at pH 2–4 containing 0.1–0.8% of soluble starch and from 0.01–0.05% of ascorbic acid, and polymerization is controlled by adding hydrogen peroxide in an amount of from 0.1 to 0.8% by weight of the water medium reacting while stirring at a temperature of 45–60° C. for a period of ½ to 2 hours. After ½ to 1½ hours of reaction at about 50° C., the product is purified by neutralizing and adding pancreatic amylase to break down the starch and filtering.

In less than two hours of polymerization reaction and after enzyme fermentation, there is achieved a pure vinyl chloride polymer having enhanced characteristics of thermal stability, aging resistance and electrical insulation. Polyvinyl chloride polymers made by conventional methods do not possess these characteristics. Further, the prior art processes take longer.

These prior art processes referred to hereinbefore are set out in Powers, U.S. Pat. No. 2,520,959; in Schildknecht, "Polymer Process," Interscience (1956), p. 558; in Condo et al., U.S. Pat. Nos. 2,674,585 and 2,674,593; in Fuhrman et al., U.S. Pat. No 2,721,859; and in C C. Winding's test, "Polymeric Materials," McGraw-Hill (1961), p. 305.

In U.S. Pat. No. 2,520,959, Powers teaches the use of sodium stearate dispersing agent in critical amounts during a 24-hour polymerizing, seeding and latex growing process under complex conditions of particle growth. The resulting polymer, exemplified in Powers, is of a smaller diameter than that used commercially. Powers recognized the harm done by the sodium stearate dispersing agent and conscientiously kept the amount to the lowest minimum consistent with the required dispersing function. Powers did not and could not eliminate the dispersant impurity coating the product recovered.

Condo et al., in Pat. No. 2,674,585, attempted to eliminate the impurity problem, encountered by Powers in his use of sodium stearate, by substituting an ammonium stearate emulsifying agent. Condo et al. recognized the need for eliminating fixed alkali and taught emulsification of the charge by a 200 p.s.i. pressure drop across a feeding orifice to the kettle in a polymerization reaction time of 16 hours. His attempt to improve, as well as to match, Geon 121 resulted in a process which has, apparently, not been widely used.

Apparently, the treatment with the ammonium salts had certain disadvantages because, in Patent No. 2,674,-593, Condo et al. proposed to mix the ammonium stearate emulsifying agent with sodium alkyl benzene sulfonate in order to produce products having better characteristics.

The Fuhrman et al. patent illustrates the achievement of large particle size and starts with polyvinyl chloride resin latex of a particle size of 0.02–2.00 microns resulting from alkali persulfate polymerization at 40–60° C. in the presence of anionic surface-active agents, e.g. long chain fatty acid soaps, long chain alkyl sulfonates, alkyl sulfosuccinates, or the like. See column 2, lines 6–30, of the Fuhrman et al. patent for a description of the starting latex. The latex, creamed to a solids content of about 40%, is spray-dried in separate portions at a temperature ranging from 200–500° F., preferably 450° F.; the dried agglomerates are ground to an average particle size of 5–15 microns and the ground samples are mixed to produce the desired particle size range varying between 4 and 20 microns in diameter.

It was surprising to find that the present process could achieve complete removal of the dispersing agent and thereby produce a new polymerized solid vinyl chloride product in a form of homopolymer free from surface-coated impurities.

The homopolymer product of the present invention results from a single step of polymerization in an aqueous medium containing hydrogen peroxide as the sole initiator, ascorbic acid as the sole promoter and starch as the sole dispersing agent, the amounts of starch, hydrogen peroxide and ascorbic acid being controlled at critical low level proportions to achieve particle diameters of narrow range and molecular weights in a narrow distribution, as evidenced by sharp melting points.

The following table summarizes the distinctive product characteristics of the novel form of polyvinyl chloride particles of the present invention.

| | Present invention | Geon 121 |
|---|---|---|
| Minimum diameter (microns) | 0.1 | 0.06 |
| Maximum diameter (microns) | 0.8 | 1.5 |
| Particle range at minimum diameter | 0.1–0.2 | |
| Particle range at maximum diameter | 0.6–0.8 | |
| Starch needed for minimum diameter (p.p.h. of water) | 0.8 | |
| Starch needed for maximum diameter (p.p.h. of water) | 0.1 | |
| Melting point, minimum (° C.) | 170 | 170 |
| Melting point, maximum (° C.) | 175 | 175 |
| Fickentscher K value | 75–78 | 76 |
| Specific viscosity (0.5% w./w. at 25° C. in cyclohexanone) | 0.55–0.63 | 0.55–0.61 |
| Molecular weight derived from specific viscosity (in thousands) | 360–710 | 410 |

The novelty of the vinyl chloride homopolymer of the present invention and of the one-step rapid process for producing it can be more fully understood by reference to the attached drawing, wherein:

FIG. 1 is a flow diagram showing the prior art process for producing polyvinyl chloride plastisol grade resin, as shown in Powers, U.S. Pat. No. 2,520,959, this process being suitable for making Geon 121;

FIG. 2 is a flow diagram showing the process and apparatus of the present invention which produces a product of particle diameter within a narrow range;

FIG. 3 is a flow diagram illustrating another prior art method and apparatus for the manufacture of a polyvinyl chloride plastisol grade resin, as in C. C. Winding, "Polymeric Materials," McGraw Hill (1961), p. 305.

Referring to the drawing and comparison of prior art FIGS. 1 and 4 with the following examples which illustrate the best mode of carrying out the present invention demonstrate the essential simplicity of the one-step process of the present invention which can be carried out with simple laboratory equipment or in large scale operation with a minimum of attention.

The apparatus requirements for the Powers process include two reactors for continuous method and a manufacturing cycle of 24 hours requiring three shifts of workmen. The apparatus requirement as summarized in the Winding text includes a separate coagulation tank and a dryer unit, two additional pieces of apparatus which are not needed in the manufacture according to the present invention. It is, of course, possible to dry the pure product resulting from the present invention by heated inert gas and by the method of Lamont, U.S. Pat. No. 1,734,260, in order to achieve a perfect spherical form for the product. If this type of heat treatment is desired, then a heating gas at a temperature of 150–170° C. may be used in the equipment of the Lamont patent in order to produce a hardened surface skin and globular shape comparable to that in FIG. 9 of the Lamont patent.

However, as shown in FIGS. 5 and 6 herein, the approximation to the spherical form of the non-spray dried product is so close that, for most purposes, no further treatment is needed. In every case of polyvinyl chloride utility, the present product has been found to perform better because of the elimination of impurities normally deriving from the dispersing agent used during polymerization. The selection of starch as dispersant is an unobvious use in vinyl chloride polymerization because of its low efficiency of dispersing power in contrast to alkaryl sulfonate, polyvinyl alcohol or sodium stearate.

Also unique is the use of ascorbic acid which appears to co-act with the starch in a new way. It appears to enhance the ability of the starch to suspend the particles of vinyl chloride during agitation of the reaction medium and it provides such as astonishing speed-up of the initiating reaction of the hydrogen peroxide that there is an almost immediate "thickening" of the vinyl chloride liquid droplets toward the achievement of solid particles.

The advantages of the foregoing initiating and promoting functions are not achieved in other systems employing starch with organic instead of hydrogen peroxides and without the simultaneous presence of the ascorbic acid. It is always good engineering practice to utilize reagents in the minimum amounts required, but it is surprising to find such an increase in rate of polymerization when the three reactants, e.g. starch, ascorbic acid and hydrogen peroxide, are combined in such small proportions.

The invention is further illustrated by reference to the following examples:

EXAMPLE I

This example illustrates the incremental addition of the hydrogen peroxide initiator to the acidified aqueous reaction medium containing 0.5% of soluble starch colloid as the sole dispersant for the controlled particle size of polyvinyl chloride.

A one gallon autoclave equipped for stirring was employed as the reaction flask. The autoclave was jacketed so that it could be heated or cooled. An agitator equipped with a turbine blade at 600 r.p.m. was employed. The flask was charged with 2000 ml. of distilled water, 2 grams of soluble starch. The mixture was brought to a boil and cooled to 25° C. To the mixture there were added 6.0 grams of concentrated hydrochloric acid and 0.25 gram of ascorbic acid to adjust the pH to a value of 2–4. The autoclave was then sealed and 150 grams of vinyl chloride were added to the autoclave. The peroxide catalyst used was 2 grams of 30% hydrogen peroxide solution. To this was added sufficient distilled water to make up 20 ml. of solution. One-half of the catalyst solution was added to initiate the reaction. As soon as the reaction temperature started to rise to 30° C., cooling water was used, and the remainder of the catalyst was added uniformly over a 40 minute period which started 10 minutes after the initial addition. After polymerization was completed, total time of 70 minutes as observed by a pressure drop, the reaction was cooled and neutralized. Enzymes consisting of pancreation amylase and barley amylase in equal parts were added to break down the starch. The amount of enzyme added was 0.05 gram. After standing 1 hour at 60° C., the product was filtered and washed with distilled water. The fine powder was dried in an oven at 50° C. The yield of finely divided polymer was 87% of theory. The molecular weight obtained as a specific viscosity in cyclohexanone of 0.5% was 0.79. The particle size as observed under the electron microscope was 0.3–0.5 microns and the photograph of this sample is shown in FIG. 5 herein.

EXAMPLE II

The same procedure was followed exactly as in Example I except that 10 grams of 30% hydrogen peroxide were made up to 100 ml. by the addition of distilled water. This was added over a period of 60 minutes. The specific viscosity obtained in cyclohexanone was 0.55. The particle size appeared to be slightly finer than that of Example I (0.2–0.3 micron), intermediate between the size shown in Example V and Example VI.

EXAMPLE III

The same procedure was followed exactly as in Example I except that all of the hydrogen peroxide was added initially. After the polymer was dried it appeared to have a very high molecular weight as determined in cyclohexanone solution. It appeared that cross-linking may have occurred because of the difficulty in dissolving the polymer in cyclohexanone. The particle size of the dried powder was 0.1–0.2 micron.

EXAMPLE IV

The same procedure was followed as in Example II except that the amount of ascorbic acid was raised to 1.0 gram. The dried polymer obtained had a specific viscosity of 0.40. The particle size was 0.2–0.4 micron.

EXAMPLE V

The same procedure was followed as in Example I except that ferrous sulfate heptahydrate 0.25 gram as a promoter was used instead of the ascorbic acid and this polymer was compared for its thermal stability with the polymer of Example I by the procedure set out in Example VI below.

EXAMPLE VI

The polymers produced in Examples I and V were evaluated in a plastisol formulation:

| | Parts |
|---|---|
| Polymer | 100 |
| Dioctylphthalate | 30 |
| Triethylene glycol dimethacrylate | 30 |
| Barium-cadmium stearate stabilizer (stabilizer B.C. 100—Advance Solvents Chemical Corporation) | 6 |
| Ditertiary butyl peroxide on a molecular sieve support (C.W. 2015—Union Carbide) | 0.3 |

This formulation was heated to 150° C. for 30 minutes. The results obtained are shown in the following table:

| Polymer | Shore D hardness | Color |
|---|---|---|
| From Example I | 35 | Good. |
| From Example V | 35 | Black, unsatisfactory. |

EXAMPLE VII

The same polymerizing procedure was followed exactly as in Example I except that the soluble starch dispersion agent was increased to 10 grams. The particle size of the final polymer was 0.1–0.2 micron and the photomicrograph of this sample is shown in FIG. 6.

EXAMPLE VIII

This example followed the procedure of Example I but a higher temperature of reaction of 70° C. was employed. After polymerization at this temperature for 1 hour the product was recovered in low yield (less than 50%). The polyvinyl chloride solid product was insoluble in cyclohexanone and unsatisfactory.

The foregoing examples illustrate the use of a mixture of pancreatic amylase and barley amylase. The pancreatic amylase can be used alone. The barley mylase can be used alone. It is sufficient to employ an amount of 0.1 part of the enzyme to 300 parts of polymer in suspension. After standing overnight, the polymer is filtered and the polymer surface is free from starch. This amylase enzyme of animal or vegetable origin will not hydrolyze polyvinyl alcohol or cellulose but will hydrolyze natural starch products. Accordingly, such natural starch products as are known and available in commerce are obviously the equivalent of the soluble starch used herein as long as they have the characteristic of being water-dispersible, hydrophilic and susceptible to hydrolysis by amylase. Any of the cereal starches, potato starch and corn starch may be used. Sorghum starch and millet starch may also be used.

From the foregoing, it is understood that all of these starches are included in the soluble starch used in the present process.

Having thus disclosed the invention, what is claimed is:

1. A method for producing pure vinyl chloride polymer in a narrow range of particle diameter between 0.1–0.8 micron and in a form free from surface coated impurities which detract from the thermal stability, aging and electrical insulation properties, the particle range at minimum diameter being 0.1–02 micron and the particle range at maximum diameter being 0.6–0.8 micron, said process consisting essentially of: introducing vinyl chloride into acidified water at pH 2–4 containing from 0.1–0.8% of soluble and water-dispersible starch susceptible to hydrolysis by amylase and selected from the group consisting of potato starch and cereal starches as the sole dispersing agent and from 0.01–0.05% of ascorbic acid as sole promoter; adding hydrogen peroxide in an amount of 0.1–0.8% by weight of the water and reacting while stirring at a temperature of 45–60° C. for a period of at least ½ hour to complete the polymerization; thereafter neutralizing the reaction medium by adding an alkaline material; adding amylase to digest the starch; and isolating the vinyl chloride polymer in a form free from contamination by the starch.

References Cited

UNITED STATES PATENTS

| | | | |
|---|---|---|---|
| 2,857,367 | 10/1958 | Ingraham et al. | 260—92.8 |
| 2,974,129 | 3/1961 | Ingraham et al. | 260—92.8 |
| 3,179,646 | 4/1965 | Nelson et al. | 260—92.8 |
| 2,163,305 | 6/1939 | Dittman. | |
| 2,497,828 | 2/1950 | Young | 260—92.8 |
| 2,401,445 | 6/1946 | White | 260—89.1 |

OTHER REFERENCES

Baxendale, J. H. Introduction to Free Radical Polymerization In Polymer Processes, ed. by C. E. Schildknecht. N.Y., Interscience Publishing, Inc. TP 156 P653, pp. 18–19.

JOSEPH L. SCHOFER, Primary Examiner

J. A. DONAHUE, JR., Assistant Examiner